(12) United States Patent
Yano et al.

(10) Patent No.: US 9,199,595 B2
(45) Date of Patent: Dec. 1, 2015

(54) CENTER CONSOLES

(71) Applicants: TOYOTA SHATAI KABUSHIKI KAISHA, Aichi (JP); TOYOTA JIDOSHA KABUSHIKI KAISHA, Aichi (JP)

(72) Inventors: Toshiki Yano, Aichi (JP); Takamichi Fujine, Aichi (JP); Youhei Emura, Aichi (JP); Masato Noritake, Aichi (JP)

(73) Assignees: Toyota Shatai Kabushiki Kaisha, Aichi (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 14/364,663

(22) PCT Filed: Nov. 20, 2012

(86) PCT No.: PCT/JP2012/080057
§ 371 (c)(1),
(2) Date: Jun. 11, 2014

(87) PCT Pub. No.: WO2013/088919
PCT Pub. Date: Jun. 20, 2013

(65) Prior Publication Data
US 2014/0333085 A1 Nov. 13, 2014

(30) Foreign Application Priority Data
Dec. 16, 2011 (JP) ................. 2011-275578

(51) Int. Cl.
*B60R 21/055* (2006.01)
*B60R 7/04* (2006.01)
*B60R 11/00* (2006.01)
*B60R 13/02* (2006.01)
*B60N 3/10* (2006.01)

(52) U.S. Cl.
CPC .............. *B60R 21/055* (2013.01); *B60R 7/04* (2013.01); *B60N 3/105* (2013.01); *B60R 13/0262* (2013.01); *B60R 2011/0007* (2013.01); *B60R 2011/0014* (2013.01)

(58) Field of Classification Search
CPC .............. B60R 2011/0007; B60R 2011/0014; B60R 13/0262; B60R 7/04; B60R 21/055; B60N 3/105
USPC ..................... 296/24.34, 37.8, 1.07
See application file for complete search history.

(56) References Cited

U.S. PATENT DOCUMENTS

| 4,109,955 A | 8/1978 | Amann et al. |
| 7,731,258 B2 * | 6/2010 | Bazinski et al. ............. 296/37.8 |
| 7,854,470 B2 * | 12/2010 | Yamaki et al. ............ 296/187.12 |

FOREIGN PATENT DOCUMENTS

| DE | 10 2006 051 948 B3 | 6/2008 |
| JP | 52-57632 A | 5/1977 |
| JP | 2010-30555 A | 2/2010 |
| JP | 2010-143502 A | 7/2010 |

* cited by examiner

*Primary Examiner* — Joseph D Pape
*Assistant Examiner* — Dana Ivey
(74) *Attorney, Agent, or Firm* — Christensen Fonder P.A.

(57) ABSTRACT

Embodiments of the present invention may include a center console having a box, a console door and a shock absorption portion. The box is installed on a floor in a vehicle interior. The console door is connected to an upper wall of a rear portion of the box via a hinge shaft, and rotates using the hinge shaft as a fulcrum so that an opening of the box upper is opened and closed. The shock absorption portion divides the rear portion of the box into the upper wall and a lower wall. The shock absorption portion connects the upper wall and the lower wall to each other with a step therebetween. The shock absorption portion is set to be thinner than the upper wall and the lower wall.

1 Claim, 4 Drawing Sheets

140 # CENTER CONSOLES

PRIORITY CLAIM

The present application is a National Phase entry of PCT Application No. PCT/JP2012/080057, filed Nov. 20, 2012, which claims priority from Japanese Patent Application No. 2011-275578, filed Dec. 16, 2011, the disclosures of which are hereby incorporated by reference herein in their entirety.

BACKGROUND OF THE INVENTION

1. Field of the Invention

Embodiments of the present invention relate to a center console situated between the right and left front seats of an automobile. More specifically, embodiments of the present invention relate to a center console provided with a structure capable of absorbing shock acting on a rear portion of the console cover from above.

2. Description of the Related Art

Japanese Laid-Open Patent Publication No. 2010-143502 discloses a technique in which a shock absorption bracket is provided at a rear portion of a box of a center console. The bracket has a shock absorption portion bent into an M-shape as seen from a side view. A console cover is mounted to an upper surface of the shock absorption bracket by a hinge.

The shock absorption bracket is a member separate from the proper constituent member of the center console. This may lead to deterioration in the design property of the center console. In view of this, it might be possible to adopt a technique in which the rigidity of the box, which is a constituent member of the center console, is reduced. A reduction in the rigidity of the box, however, would result in wobbling of the box when an elbow or the like were placed on an upper surface of a console door when using it as an armrest. This would create a loss in the stability of the box.

Thus, there is a need in the art for a structure capable of absorbing a shock acting from above on a rear portion of a console cover while securing the adequate design property of the center console and the rigidity thereof as needed in the normal state.

SUMMARY OF THE INVENTION

According to an aspect of the present invention, a center console has a box, a console door and a shock absorption portion. The box is installed on a floor in a vehicle interior. The console door is connected to an upper wall of a rear portion of the box via a hinge shaft, and rotates using the hinge shaft as a fulcrum so that an opening of the box upper is opened and closed. The shock absorption portion divides the rear portion of the box into the upper wall and a lower wall. The shock absorption portion connects the upper wall and the lower wall to each other with a step therebetween. The shock absorption portion is set to be thinner than the upper wall and the lower wall.

As a result, it is possible to secure the design property of the center console and the rigidity thereof as required in the normal state. When a shock acts on the rear portion of the console door from above, the shock is transmitted to the upper wall of the shock absorption wall via the hinge shaft, and the shock absorption wall is fractured. As a result, the upper wall is separated from the lower wall at the shock absorption portion and moves downwards. This absorbs the shock.

DETAILED DESCRIPTION OF THE INVENTION

Figure 1:
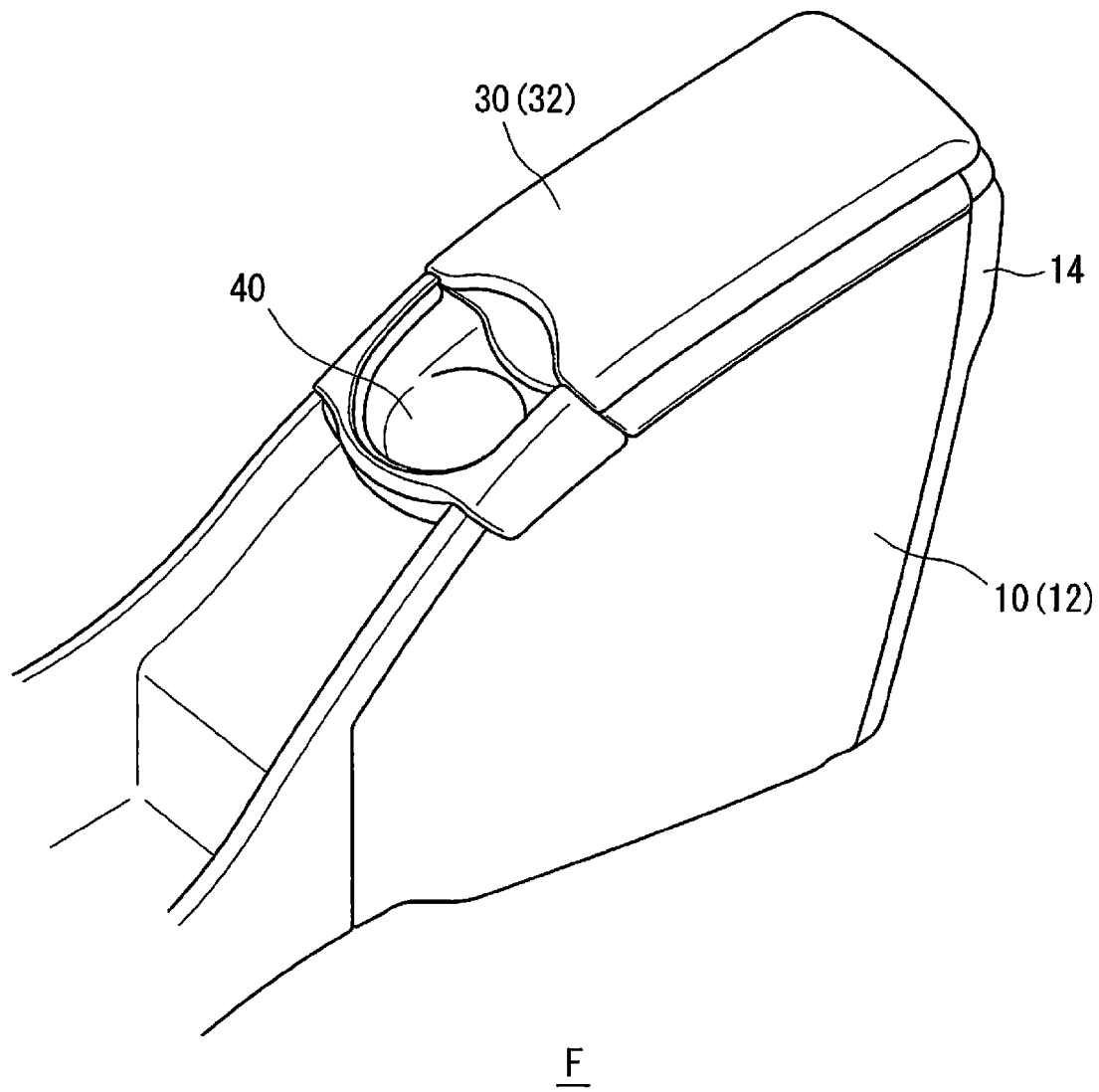
FIG. 1 is a perspective view of a portion of a center console.
Figure 3:
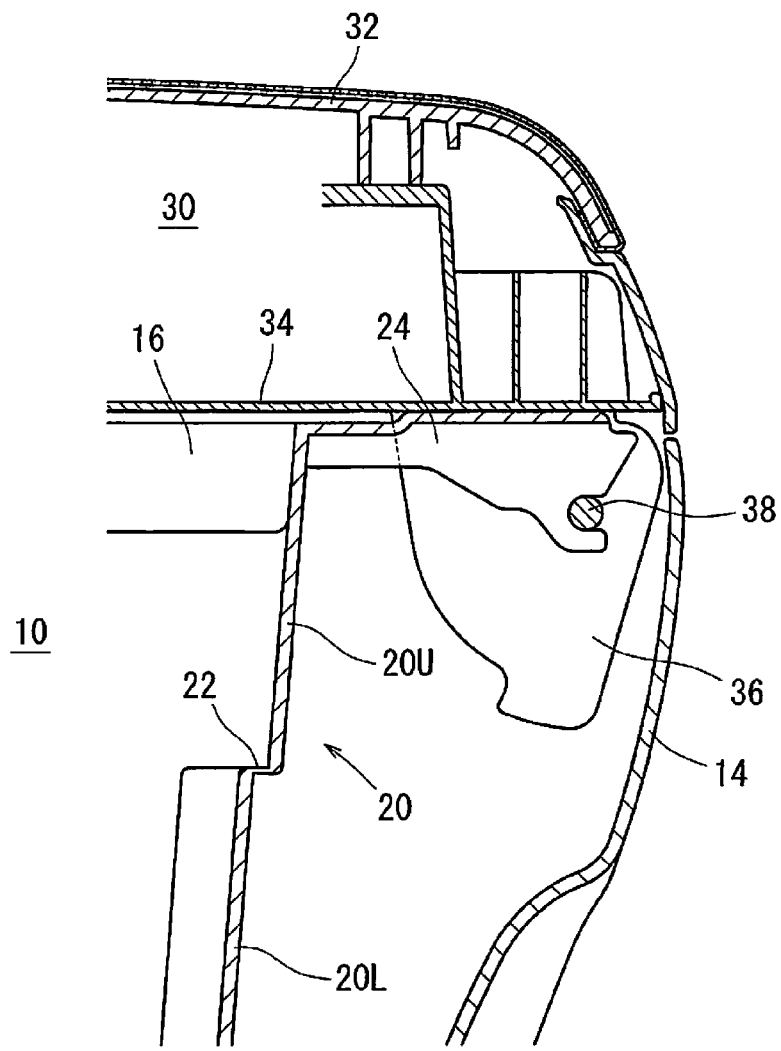
FIG. 3 is an enlarged vertical cross-sectional view of a rear upper portion of the center console.

An embodiment of the present invention will be described with reference to the drawings. A center console is provided between the right and left front seats of an automobile. The center console has a box 10 and a console door 30. As shown in FIG. 1, the box 10 is installed on a floor F. The box 10 has a storage space in its interior, and an opening in the upper of the storage space. The opening allows access to the storage space. The console door 30 has a configuration covering the opening of the box 10, and is connected to the box 10 via a hinge shaft 38 (FIG. 3).

A cup holder 40 is provided in a front portion (the left-hand side in the drawing) of the console door 30 on an upper surface of the box 10 (FIG. 1).

Figure 2:
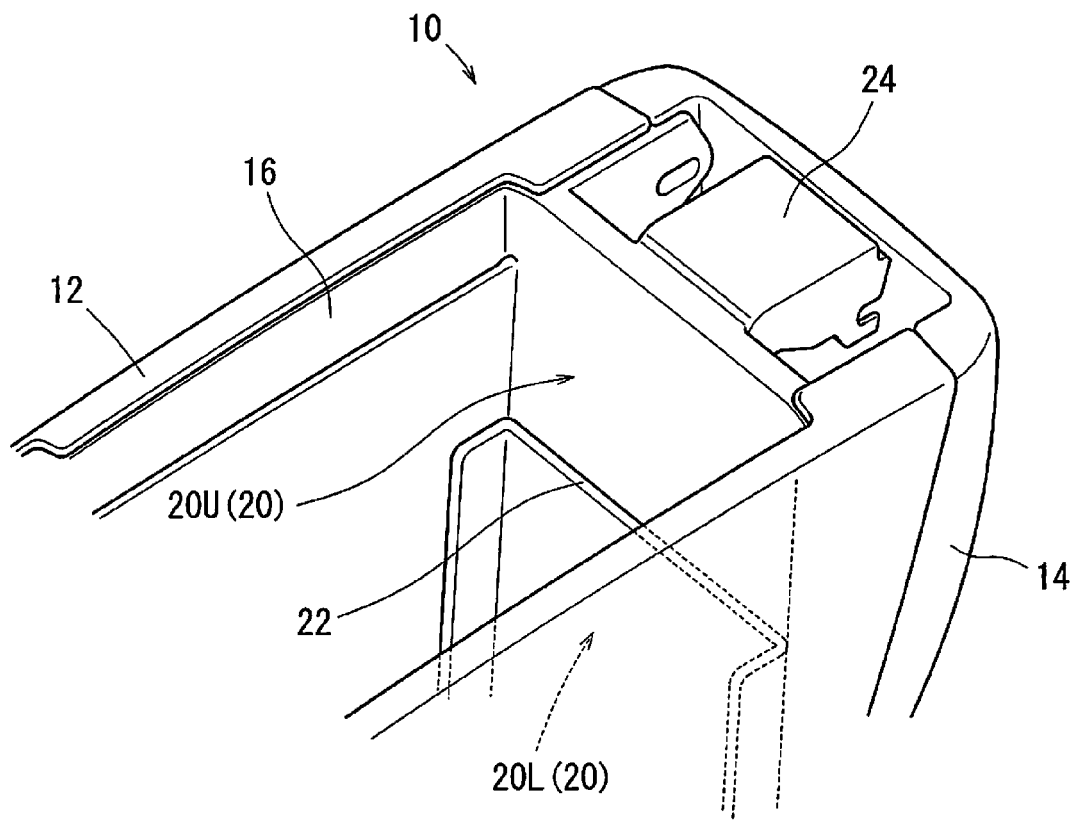
FIG. 2 is a perspective view of a rear portion of a box of the center console.

The box 10 has a box outer 12 and a box inner 16 (FIG. 2). The box outer 12 is formed of resin, and constitutes an outer shell of the box 10. The box inner 16 is formed of resin, and is situated within the box outer 12. The box inner 16 has a rear wall 16a erecting at the rear portion, side walls 16b continuous with both ends of the rear wall 16a, and corner portions 16c connecting the rear wall 16a and the side walls 16b to each other such that they are substantially orthogonal to each other.

As shown in FIG. 2, a shock absorption wall 20 is formed at the rear wall 16a and the rear portions of the side walls 16b, and is provided with a shock absorption portion 22. The shock absorption portion 22 has a rear portion 22a formed on the rear wall 16a, and side portions 22b and vertical portions 22c formed on the side walls 16b. The rear portion 22a extends horizontally along the rear wall 16a, dividing the rear wall 16a into upper and lower regions. The side portions 22b extend horizontally from the rear portion 22a, dividing the rear regions of the side portions 22b into upper and lower regions. The vertical portions 22c extend from the front ends of the side portions 22b down to the bottom of the storage space.

With the shock absorption portion 22 serving as a boundary, the shock absorption wall 20 is divided into an upper wall portion (upper wall) 20U and a lower wall portion (lower wall) 20L. The upper wall portion 20U and the lower wall portion 20L are connected together, with a step created by the shock absorption portion 22 lying therebetween. The shock absorption portion 22 is set to be thinner than the upper wall portion 20U and the lower wall portion 20L of the shock absorption wall 20 (FIG. 3). Due to the shock absorption portion 22, the lower wall portion 20L protrudes farther into the storage space of the box 10 than the upper wall portion 20U.

A hinge bracket 24 is integrally formed with the upper portion of the rear wall 16a of the box inner 16. That is, the hinge bracket 24 is integrally formed with the upper wall portion 20U of the shock absorption portion 20.

The console door 30 has a door outer 32 formed of resin, and a door inner 34 formed of resin (FIG. 3). The door inner 34 is situated on the inner side of the door outer 32. A hinge bracket 36 is integrally formed with the rear lower surface (on the right-hand side in the drawing) of the door inner 34. The hinge bracket 36 and the hinge bracket 24 of the box inner 16 are connected by the hinge shaft 38. The hinge constituent member is accommodated on the inner side of a rear garnish 14 attached to the rear of the box outer 12 (FIG. 3).

The console door 30 has a rear portion connected to the box 10 by the hinge shaft 38. The console door 30 rotates using the hinge shaft 38 as the fulcrum. This makes it possible to open and close the opening of the box 10.

Figures 4, 5:
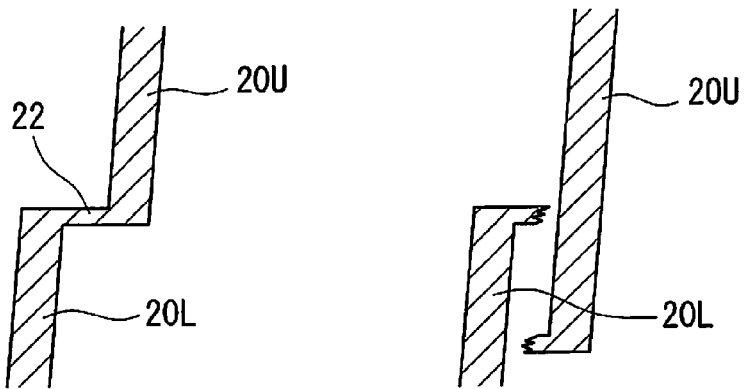
FIG. 4 is a schematic view of a shock absorption wall.
FIG. 5 is a schematic view of the shock absorption wall after absorbing a shock.

In the case of back collision or the like of the automobile, a shock of not less than a predetermined value may be applied to the rear portion of the console door 30 due to the occupant seated in the rear seat. In this case, the shock is transmitted to the shock absorption wall 20 of the box 10 (the box inner 16) via the hinge shaft 38. As a result, the thin-walled shock absorption portion 22 of the shock absorption wall 20 is fractured. In absorbing the shock, the upper wall portion 20U of the shock absorption wall 20 moves from the position shown in FIG. 4 to the position shown in FIG. 5.

Figure 6:
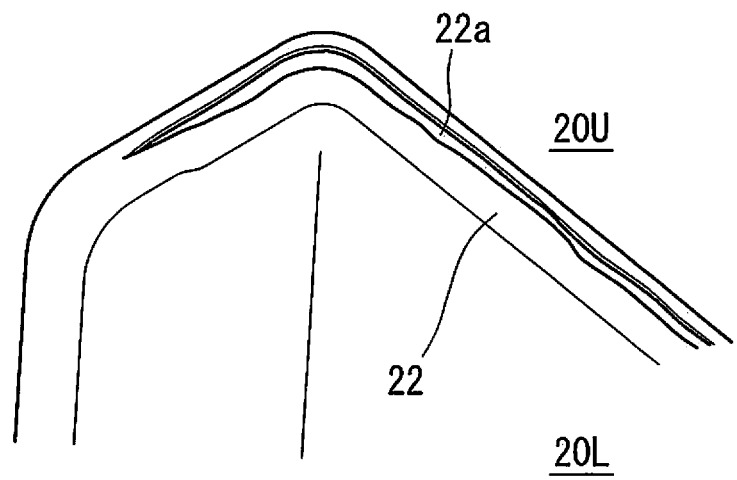
FIG. 6 is an enlarged perspective view of a portion of the shock absorption wall after absorbing a shock.

The shock absorption portion 22 is continuous from the rear wall 16a of the box inner 16 to parts of both side walls 16b via the corner portions 16c on both sides. Thus, the fracture of the shock absorption portion 22 due to the shock occurs continuously from the rear wall 16a to part of both side walls 16b. As shown in FIG. 6, this is apparent from the configuration of a continuous crack 22d generated in the shock absorption portion 22 after the shock absorption.

The fracture of the shock absorption portion 22 occurs continuously from the rear wall 16a of the box inner 16 to parts of both side walls 16b. Thus, the upper wall portion 20U of the shock absorption wall 20 properly moves downwardly. This makes it possible to absorb the shock.

The shock absorption wall 20 is formed on the rear wall 16a and both side walls 16b of the box inner 16. The upper wall portion 20U and the lower wall portion 20L are connected in a step-like configuration due to the shock absorption portion 22. Thus, it is possible to maintain the adequate design property of the center console. It is also possible to secure the rigidity as required when an elbow or the like is placed on the upper surface of the console door 30 when using it as an armrest in the normal state.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

As shown in FIG. 2, the lower wall portion 20L may protrude further into the storage space of the box 10 than the upper wall portion 20U due to the shock absorption portion 22. Alternatively, the lower wall portion 20L may protrude further to the exterior of the box 10 than the upper wall portion 20U due to the shock absorption portion 22.

As shown in FIG. 3, the console door 30 may have a rear portion connected to the rear portion of the box 10 via the hinge shaft 38. Alternatively, the console door may have a side portion connected to the left portion or the right portion of the box 10 via a hinge shaft.

The invention claimed is:

1. A center console comprising:
a box installed on a floor in a vehicle interior, the box defining a storage space and comprising:
a rear wall having an upper rear wall and a lower rear wall, the upper rear wall offset rearwardly from the lower rear wall within the storage space, and
a pair of side walls respectively continuous with two sides of the rear wall, each of the pair of side walls having a main region that is continuous with the upper rear wall and having a lower-rear region that is continuous with the lower rear wall, each of the lower-rear regions of the pair of side walls protruding respectively from each of the main regions toward the storage space; and
a shock absorption portion having:
a rear portion connecting the upper rear wall and the lower rear wall, and forming a step therebetween, the rear portion being thinner than the upper rear wall and being thinner than the lower rear wall,
a pair of side portions, each side portion connecting one of the main regions of the side walls to a top end of one of the lower-rear regions of the side walls, and forming a step therebetween, each of the pair of side portions extending from an end of the rear portion, and
a pair of vertical portions, each of the vertical portions connecting one of the main regions of the sidewalls to a front end of one of the lower-rear regions, and forming a step therebetween, each of the pair of vertical portions extending from a front end of one of the side portions downwardly to a bottom of the storage space; and
a console door connected to the upper rear wall of the box via a hinge shaft, and rotatable using the hinge shaft as a fulcrum so that an opening of the storage space may be opened and closed.

* * * * *